(12) United States Patent
Hinckley

(10) Patent No.: US 9,134,760 B2
(45) Date of Patent: Sep. 15, 2015

(54) CHANGING POWER MODE BASED ON SENSORS IN A DEVICE

(75) Inventor: Kenneth P. Hinckley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/175,655

(22) Filed: Jul. 1, 2011

(65) Prior Publication Data

US 2011/0264928 A1    Oct. 27, 2011

Related U.S. Application Data

(63) Continuation of application No. 10/294,286, filed on Nov. 14, 2002, now Pat. No. 8,120,625, which is a continuation-in-part of application No. 09/875,477, filed on Jun. 6, 2001, now Pat. No. 7,289,102, said application No. 10/294,286 is a continuation-in-part of application No. 10/162,487, filed on Jun. 3, 2002, now Pat. No. 7,302,280, which is a continuation-in-part of application No. 09/875,477, filed on Jun. 6, 2001, now Pat. No. 7,289,102.

(60) Provisional application No. 60/218,748, filed on Jul. 17, 2000.

(51) Int. Cl.
*G09G 5/00* (2006.01)
*G06F 1/16* (2006.01)
*G06F 1/32* (2006.01)
*H04M 1/725* (2006.01)

(52) U.S. Cl.
CPC ............ *G06F 1/1626* (2013.01); *G06F 1/1684* (2013.01); *G06F 1/3203* (2013.01); *G06F 1/3231* (2013.01); *G06F 2200/1614* (2013.01); *G06F 2200/1637* (2013.01); *H04M 1/72569* (2013.01); *H04M 2250/12* (2013.01); *Y02B 60/1289* (2013.01)

(58) Field of Classification Search
CPC ... G06F 1/1626; G06F 1/3231; G06F 1/1684; G06F 1/3203; G06F 2200/1637; G06F 2200/1614; H04M 1/72569; H04M 2250/12; Y02B 60/1289
USPC .......................... 345/156, 173–178, 211–213; 178/18.01–19.07
See application file for complete search history.

(56) References Cited

U.S. PATENT DOCUMENTS 4,504,701 A   3/1985   Lucchesi
5,119,079 A   6/1992   Hube et al.
(Continued)

FOREIGN PATENT DOCUMENTS

JP   63284678 A   11/1988
JP   8-292826     11/1996
(Continued)

OTHER PUBLICATIONS

Innoventions' RotoView™, The Intuitive Display Navigation Solution for Hand Held Devices, Background and Problem Definition, 2000, 2003.
(Continued)

*Primary Examiner* — Rodney Amadiz
(74) *Attorney, Agent, or Firm* — Dan Choi; Judy Yee; Micky Minhas

(57) ABSTRACT

An orientation of a device is detected based on a signal from at least one orientation sensor in the device. In response to the detected orientation, the device is placed in a full power mode.

18 Claims, 10 Drawing Sheets

(56) References Cited

U.S. PATENT DOCUMENTS

| | | |
|---|---|---|
| 5,142,655 A | 8/1992 | Drumm |
| 5,329,577 A | 7/1994 | Morimatsu |
| 5,334,805 A | 8/1994 | Knowles et al. |
| 5,337,353 A | 8/1994 | Boie et al. |
| 5,347,295 A * | 9/1994 | Agulnick et al. ............. 345/156 |
| 5,396,443 A * | 3/1995 | Mese et al. .................... 713/321 |
| 5,481,595 A | 1/1996 | Ohashi et al. |
| 5,499,334 A | 3/1996 | Staab |
| 5,586,182 A * | 12/1996 | Miyashita .................... 379/413 |
| 5,602,566 A | 2/1997 | Motosyuku et al. |
| 5,657,372 A | 8/1997 | Ahlberg et al. |
| 5,661,632 A | 8/1997 | Register |
| 5,689,665 A | 11/1997 | Mitsui et al. |
| 5,705,997 A | 1/1998 | Park |
| 5,712,911 A | 1/1998 | Her |
| 5,714,997 A | 2/1998 | Anderson |
| 5,761,071 A | 6/1998 | Bernstein et al. |
| 5,812,865 A | 9/1998 | Theimer et al. |
| 5,860,016 A | 1/1999 | Nookala et al. |
| 5,910,882 A | 6/1999 | Burrell |
| 5,924,046 A | 7/1999 | Martensson |
| 5,963,952 A | 10/1999 | Smith |
| 5,995,852 A | 11/1999 | Yasuda et al. |
| 6,104,969 A | 8/2000 | Beeks |
| 6,115,025 A | 9/2000 | Buxton et al. |
| 6,119,186 A | 9/2000 | Watts et al. |
| 6,137,468 A | 10/2000 | Martinez et al. |
| 6,148,149 A * | 11/2000 | Kagle ............................. 396/50 |
| 6,157,935 A | 12/2000 | Tran et al. |
| 6,184,847 B1 | 2/2001 | Fateh et al. |
| 6,201,554 B1 | 3/2001 | Lands |
| 6,215,993 B1 | 4/2001 | Ulveland |
| 6,216,016 B1 | 4/2001 | Cronin |
| 6,216,106 B1 | 4/2001 | John |
| 6,246,862 B1 | 6/2001 | Grivas et al. |
| 6,259,787 B1 | 7/2001 | Schulze |
| 6,288,704 B1 | 9/2001 | Flack et al. |
| 6,292,674 B1 | 9/2001 | Davis |
| 6,298,314 B1 | 10/2001 | Blackadar et al. |
| 6,304,765 B1 | 10/2001 | Cosgrove et al. |
| 6,310,955 B1 | 10/2001 | Reeves |
| 6,314,426 B1 | 11/2001 | Martin et al. |
| 6,335,725 B1 | 1/2002 | Koh et al. |
| 6,340,957 B1 | 1/2002 | Adler et al. |
| 6,374,145 B1 | 4/2002 | Lignoul |
| 6,381,540 B1 | 4/2002 | Beason et al. |
| 6,408,187 B1 | 6/2002 | Merriam |
| 6,426,736 B1 | 7/2002 | Ishihara |
| 6,445,383 B1 * | 9/2002 | Chambers et al. ............ 345/173 |
| 6,449,363 B1 | 9/2002 | Kielsnia |
| 6,452,494 B1 * | 9/2002 | Harrison .................... 340/545.4 |
| 6,466,198 B1 | 10/2002 | Feinstein |
| 6,492,979 B1 | 12/2002 | Kent et al. |
| 6,509,907 B1 | 1/2003 | Kuwabara |
| 6,516,202 B1 | 2/2003 | Hawkins et al. |
| 6,532,447 B1 | 3/2003 | Christensson |
| 6,542,436 B1 | 4/2003 | Myllyla |
| 6,545,669 B1 | 4/2003 | Kinawi et al. |
| 6,560,466 B1 | 5/2003 | Skorko |
| 6,567,068 B2 | 5/2003 | Rekimoto |
| 6,567,101 B1 * | 5/2003 | Thomas ........................ 345/649 |
| 6,573,883 B1 | 6/2003 | Bartlett |
| 6,597,384 B1 * | 7/2003 | Harrison ........................ 345/204 |
| 6,599,130 B2 | 7/2003 | Moehrle |
| 6,621,508 B1 | 9/2003 | Shiraishi et al. |
| 6,621,800 B1 | 9/2003 | Klein |
| 6,624,824 B1 | 9/2003 | Tognazzini et al. |
| 6,631,192 B1 | 10/2003 | Fukiharu |
| 6,658,272 B1 | 12/2003 | Lenchik et al. |
| 6,765,553 B1 | 7/2004 | Odamura |
| 6,809,724 B1 * | 10/2004 | Shiraishi et al. ............. 345/169 |
| 6,822,683 B1 | 11/2004 | Torikai |
| 6,931,592 B1 | 8/2005 | Ramaley et al. |
| 6,970,182 B1 | 11/2005 | Schultz et al. |
| 7,006,881 B1 | 2/2006 | Hoffberg et al. |
| 7,103,852 B2 | 9/2006 | Kairis |
| 7,164,432 B1 * | 1/2007 | Amemiya .................... 345/649 |
| 7,200,559 B2 | 4/2007 | Wang |
| 7,263,607 B2 | 8/2007 | Ingerman et al. |
| 7,289,102 B2 | 10/2007 | Hinckley et al. |
| 7,302,280 B2 | 11/2007 | Hinckley et al. |
| 7,409,540 B2 | 8/2008 | Ingerman et al. |
| 7,460,105 B2 | 12/2008 | Rosenberg et al. |
| 7,532,196 B2 | 5/2009 | Hinckley |
| 8,120,625 B2 | 2/2012 | Hinckley |
| 2001/0044318 A1 | 11/2001 | Mantyjarvi et al. |
| 2002/0049738 A1 | 4/2002 | Epstein |
| 2002/0053019 A1 | 5/2002 | Ruttan et al. |
| 2002/0093491 A1 | 7/2002 | Gillespie et al. |
| 2002/0116205 A1 | 8/2002 | Ankireddipally et al. |
| 2002/0140675 A1 | 10/2002 | Ali et al. |
| 2002/0184373 A1 | 12/2002 | Maes |
| 2003/0009698 A1 | 1/2003 | Lindeman et al. |
| 2003/0030680 A1 | 2/2003 | Cofta et al. |
| 2003/0055655 A1 | 3/2003 | Suominen |
| 2003/0085870 A1 | 5/2003 | Hinckley |
| 2003/0104800 A1 | 6/2003 | Zak |
| 2003/0105812 A1 | 6/2003 | Flowers, Jr. et al. |
| 2003/0145094 A1 | 7/2003 | Staamann et al. |
| 2003/0176205 A1 | 9/2003 | Oota et al. |
| 2003/0188151 A1 | 10/2003 | Sato et al. |
| 2003/0222917 A1 | 12/2003 | Trantow |
| 2004/0078596 A1 | 4/2004 | Kent, Jr. et al. |
| 2004/0148356 A1 | 7/2004 | Bishop, Jr. et al. |
| 2004/0153512 A1 | 8/2004 | Friend |
| 2004/0203589 A1 | 10/2004 | Wang et al. |
| 2004/0243678 A1 | 12/2004 | Smith |
| 2005/0030255 A1 | 2/2005 | Chiu et al. |

FOREIGN PATENT DOCUMENTS

| | | |
|---|---|---|
| JP | 2000124970 | 4/2000 |
| JP | 2001094636 | 4/2001 |
| WO | 98/14863 | 4/1998 |
| WO | 99/22338 | 5/1999 |

OTHER PUBLICATIONS

Prosecution documents associated with U.S. Appl. No. 10/294,286 including: Notice of Appeal filed Jun. 23, 2011, Final Office Action mailed Mar. 23, 2011, Amendment filed Jan. 20, 2011, Office Action mailed Oct. 20, 2010.

Office Action from corresponding U.S. Appl. No. 13/175,649, dated Dec. 19, 2011, 17 pages.

Prosecution documents associated with U.S. Appl. No. 13/175,651 including: Office Action mailed Feb. 24, 2012.

Manco, Giuseppe, et al., "A Framework for Adaptive Mail Classification", ICAR-CNR—Institute of Italian National Research Council, 2002 IEEE, pp. 387-392.

Prosecution documents associated with U.S. Appl. No. 09/875,477 including: Notice of Allowance mailed Aug. 24, 2007; Amendment After Final filed Aug. 8, 2007; Final Office Action mailed Jun. 8, 2007; Amendment filed Mar. 7, 2007; Office Action mailed Dec. 7, 2006; Amendment filed Sep. 25, 2006; Interview Summary filed Sep. 25, 2006 Office Action mailed Jun. 20, 2006; Amendment filed Apr. 10, 2006; Office Action mailed Jan. 9, 2006; Amendment filed May 31, 2005; Supplemental Response filed Dec. 15, 2004; Interview Summary filed Nov. 22, 2004; Amendment with RCE filed Sep. 30, 2004.

Prosecution documents associated with U.S. Appl. No. 10/294,286 including: Office Action mailed Apr. 25, 2007; Appeal Brief filed Dec. 26, 2006; Notice of Appeal filed Nov. 2, 2006; Interview Summary filed Oct. 10, 2006; Final Office Action mailed Aug. 22, 2006; Amendment filed Jul. 10, 2006; Office Action mailed Apr. 6, 2006; Amendment filed Feb. 6, 2006; Advisory Action filed Jan. 18, 2006; Amendment After Final filed Dec. 12, 2005; Final Office Action mailed Nov. 2, 2005; Amendment filed Oct. 13, 2005, Office Action mailed Jul. 22, 2005.

(56) References Cited

OTHER PUBLICATIONS

Office Action mailed on Feb. 1, 2013 for corresponding U.S. Appl. No. 13/175,651.
Amendment filed Jul. 27, 2012 and Office Action mailed Jun. 13, 2013 for corresponding U.S. Appl. No. 13/175,649.
Office Action mailed Jul. 26, 2013 for corresponding U.S. Appl. No. 13/175,651.
Amendment filed on May 1, 2013 for corresponding U.S. Appl. No. 13/175,651.
Amendment filed Aug. 30, 2013 and Office Action mailed Oct. 25, 2013 for U.S. Appl. No. 13/175,649.
Amendment with RCE filed Feb. 24, 2014, and Non-Final Rejection dated Jun. 2, 2014, from U.S. Appl. No. 13/175,649. 30 pages.
Amendment filed Aug. 30, 2013, Non-Final Rejection dated Nov. 29, 2013, and Amendment field Feb. 27, 2014, from U.S. Appl. No. 13/175,651. 34 pages.
DoubleClickWidth, http://technet.microsoft.com/en-us/library/cc978663(d=printer).aspx. Printed on Oct. 9, 2012.
DoubleClickHeight, http://technet.microsoft.com/en-us/library/cc978661(d=printer).aspx, Printed on Oct. 9, 2012.
ShellconSize, http://technet.microsoft.com/en-us/library/cc938239(d=printer).aspx. Printed on Oct. 9, 2012.
Size, http://technet.microsoft.com/en-us/library/cc938240(d=printer).aspx. Printed on Oct. 9, 2012.
Hinckley et al. K. "Sticking: Pen Gestures that Span Multiple Displays", http://patrickbaudisch.com/publishers/2004-Hickley-AVI04-Stiching.pdf, Oct. 6, 2003.
Hinckley, K. "Bumping Object Together as Semantically Rich Way Forming Connections between Ubiquitous Devices", UbiComp 2003 conference, Oct. 12, 2003.
Hinkley, K. "Synchronous Gestures for Multiple Persons and Computers", Proceedings of the 16th Annual ACM Symposium on User Interface Software and Technology, Vancouver, Canada, pp. 149-158, Nov. 2-5, 2003.
Hinkley, K. Distribution and Local Sensing Techniques for Face-to-Face Collaboration (Short Paper), Proceedings of the 5th International Conference on Multimodal Interfaces, Vancouver, British Columbia, Canada, pp. 81-84, Nov. 3-5, 2003.
Microsoft Visual C# Programming: Introduction to Dialog Boxes, 2010, retrieved at http://csharpkey.com/visualcsharp/dlboxes/introduction.htm on Mar. 19, 2012.
Harrison, et al., "The Design and Use of Squeezable Computers: An Exploration of Manipulative User Interfaces," pp. 1-8, (Apr. 18-23, 1998). CHI '98.
Final Rejection dated Jun. 16, 2014 from U.S. Appl. No. 13/175,651. 21 pages.
Amendment dated Aug. 26, 2014 from U.S. Appl. No. 13/175,649. 14 pages.
Amendment dated Sep. 27, 2005 from U.S. Appl. No. 10/294,286. 7 pages.
Amendment dated Mar. 14, 2005 from U.S. Appl. No. 10/162,487. 11 pages.
"Final Office Action Issued in U.S Appl. No. 13/175,649", Mailed Date: Dec. 19, 2014, 19 Pages.
Rekimoto et al., J., "SyncTap: An Interaction Technique for Mobile Networking", New Generation of IP-Phone Enabled Mobile Devices, Mobile HCI 2002, pp. 319-323, 2002.
Manco, Giuseppe, et al., "A Framework for Adaptive Mail Classification", ICAR-CNR-Institute of Italian National Research Council, 2002 IEEE, pp. 387-392.
Prosecution documents associated with U.S. Appl. No. 09/875,477 including: Notice of Allowance mailed Aug. 24. 2007; Amendment After Final filed Aug. 8, 2007; Final Office Action mailed Jun. 8, 2007; Amendment filed Mar. 7, 2007; Office Action mailed Dec. 7, 2006; Amendment filed Sep. 25, 2006; Interview Summary filed Sep. 25, 2006 Office Action mailed Jun. 6, 2006; Amendment filed Apr. 10, 2006; Office Action mailed Jan. 9, 2006; Amendment filed May 31, 2005; Supplemental Response filed Dec. 15, 2004; Interview Summary filed Nov. 22, 2004; Amendment with RCE filed Sep. 30, 2004;.

Prosecution documents associated with U.S. Appl. No. 09/875,477 including: Advisory Action mailed Aug. 27, 2004; Office Action mailed Mar. 14, 2005; Amendment After Final filed Jul. 6, 2004; Final Office Action mailed Apr. 30, 2004; Amendment filed Feb. 9, 2004; Office Action mailed Oct. 6, 2003.
Prosecution documents associated with U.S. Appl. No. 10/162,487 including: Notice of Allowance mailed Sep. 27, 2007; Amendment After Final filed Sep. 13, 2007; Final Office Action mailed Jun. 5, 2007; Amendment filed Apr. 27, 2007; Office Action mailed Jan. 25, 2007; Advisory Action mailed Nov. 16, 2006; Amendment filed Oct. 31, 2006; Interview Summary filed Oct. 10, 2006; Final Office Action mailed Aug. 29, 2006; Amendment filed Jul. 19, 2006; Office Action mailed Apr. 17, 2006; Amendment with RCE filed Jan. 30, 2006; Final Office Action mailed Dec. 1, 2005; Amendment filed Sep. 15, 2005.
Prosecution documents associated with U.S. Appl. No. 10/162,487 including: Office Action mailed Jun. 13, 2005; Amendment filed Apr. 25, 2005; Office Action mailed Jan. 7, 2005.
Prosecution documents associated with U.S. Appl. No. 10/294,286 including: Notice of Allowance mailed Dec. 14, 2011; Appeal Brief filed Sep. 29, 2011; Amendment with RCE filed Sep. 28, 2010; Final Office Action mailed Jul. 28, 2010; Amendment filed Jun. 1, 2010; Office Action mailed Mar. 1, 2010; Amendment with RCE filed Jan. 26, 2010; Final Office Action mailed Dec. 9, 2009; Amendment filed Sep. 21, 2009; Office Action mailed Jul. 1, 2009; Amendment with RCE filed Apr. 15, 2009; Examiner's Anser to Appeal Brief mailed Nov. 2, 2007; Appeal Brief filed Jul. 25, 2007; Notice of Appeal filed Jul. 25, 2007.
Prosecution documents associated with U.S. Appl. No. 10/294,286 including: Office Action mailed Apr. 25, 2007; Appeal Brief filed Dec. 26, 2006; Notice of Appeal filed Nov. 2, 2006; Interview Summary filed Oct. 10, 2006; Final Office Action mailed Aug. 22, 2006; Amendment filed Jul. 10, 2006; Office Action mailed Apr. 6, 2006; Amendment filed Feb. 6, 2006; Advisory Action filed Jan. 18, 2006; Amendment After Final filed Dec. 12, 2005; Final Office Action mailed Nov. 2, 2005; Amendment filed Oct. 13, 2005; Office Action mailed Jul. 22, 2005.
Prosecution documents associated with U.S. Appl. No. 13/175,649 including: Final Office Action mailed May 2, 2012; Amendment filed Mar. 19, 2012.
Prosecution documents associated with U.S. Appl. No. 13/175,651 including: Final Office Action mailed Jul. 10, 2012; Amendment filed Jun. 25, 2012.
Hinckley, et al., "Sensing Techniques for Mobile Interaction," CHI Letters vol. 2.2; Copyright 2000, ACM 1-55113-232-3, pp. 91-100.
RotoView™ by Innoventions, How It Works, 1995, 2003.
One page (19) from Technology Review dated Mar. 2002.
RotoView™ by Innoventions, Features and Specifications, 1995, 2003.
RotoView™ by Innoventions, The Intuitive Display Navigation Solution for Hand Held Devices, 1995, 2003.
Innoventions' RotoView™, The Intuitive Display Navigation Solution for Hand Held Devices, Background and Problem Definition, 2000, 2003.
Bartlett, J.F., "Rock'n'Scroll is Here to Stay," IEEE Computer Graphics and Applications, pp. 40-45, (May/Jun. 2000).
Harrison, Beverly L. et al, "Squeeze Me, Hold Me, Tilt Me! An Exploration of Manipulative User Interfaces," pp. 17-24 (Apr. 18-23, 1998), CHI '98.
Rekimoto, Jun, "Tilting Operations for Small Screen Interfaces (Tech Note)," pp. 167-168, UIST '96.
Schmidt, Albrect, "Implicit Human Computer Interaction Through Context," pp. 1-5, 2nd Workshop on Human Computer Interaction with Mobile Devices, 1999.
Schmidt, Albrect et al., "There is More to Context Than Location," Environment Sensing Technologies for Adaptive Mobile User Interfaces, 5 pages, IMC '98.
Small, David et al., "Design of Spatially Aware Graspable Displays," Extended Abstracts of CHI '97, pp. 1-2 (Mar. 22-27, 1997).
Schmidt, Albrecht et al., "Advanced Interaction in Context," 13 pages, HUC '00.

(56) References Cited

OTHER PUBLICATIONS

Prosecution documents associated with U.S. Appl. 10/294,286 including: Notice of Appeal filed Jun. 23, 2011 Final Office Action mailed Mar. 23, 2011 Amendment filed Jan. 20, 2011 Office Action mailed Oct. 20, 2010.

Prosecution History for U.S. Appl. No. 13/175,651 including: Non-Final Office Action dated Apr. 9, 2015 and Amendment with RCE dated Sep. 23, 2014, 36 pages.

Amendment with RCE from U.S. Appl. No. 13/175,649 dated Apr. 2, 2015, 11 pages.

* cited by examiner

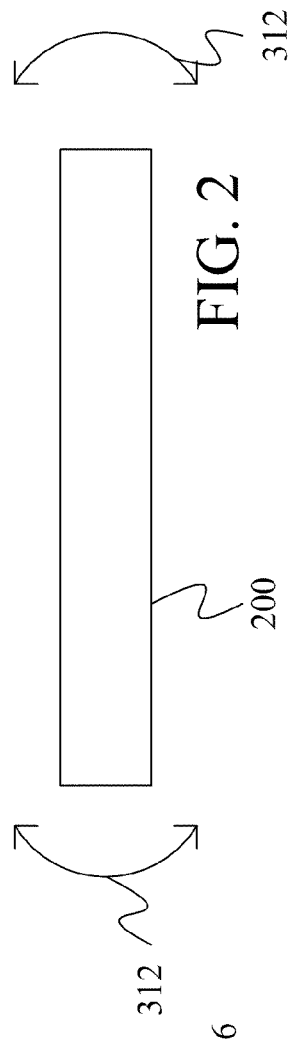
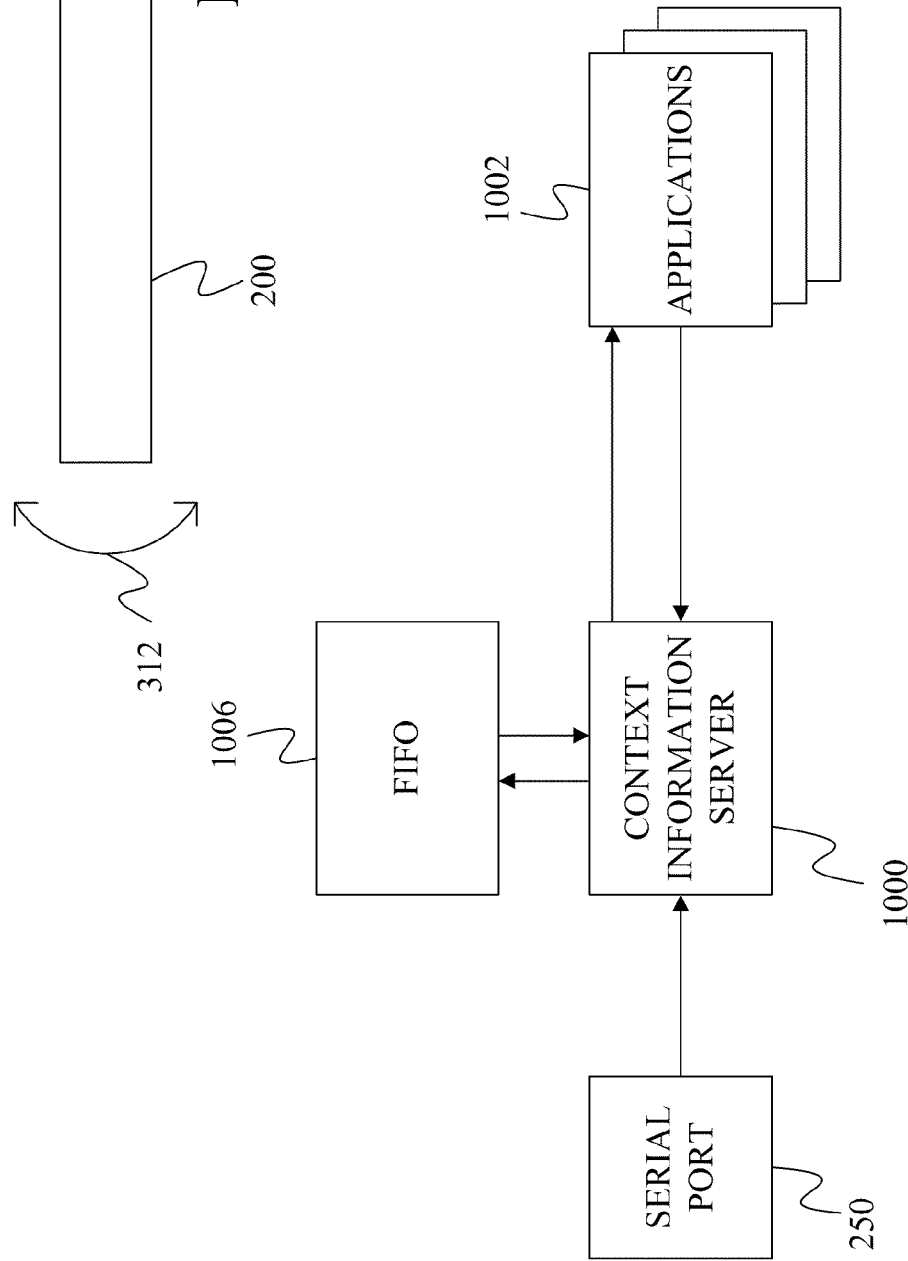

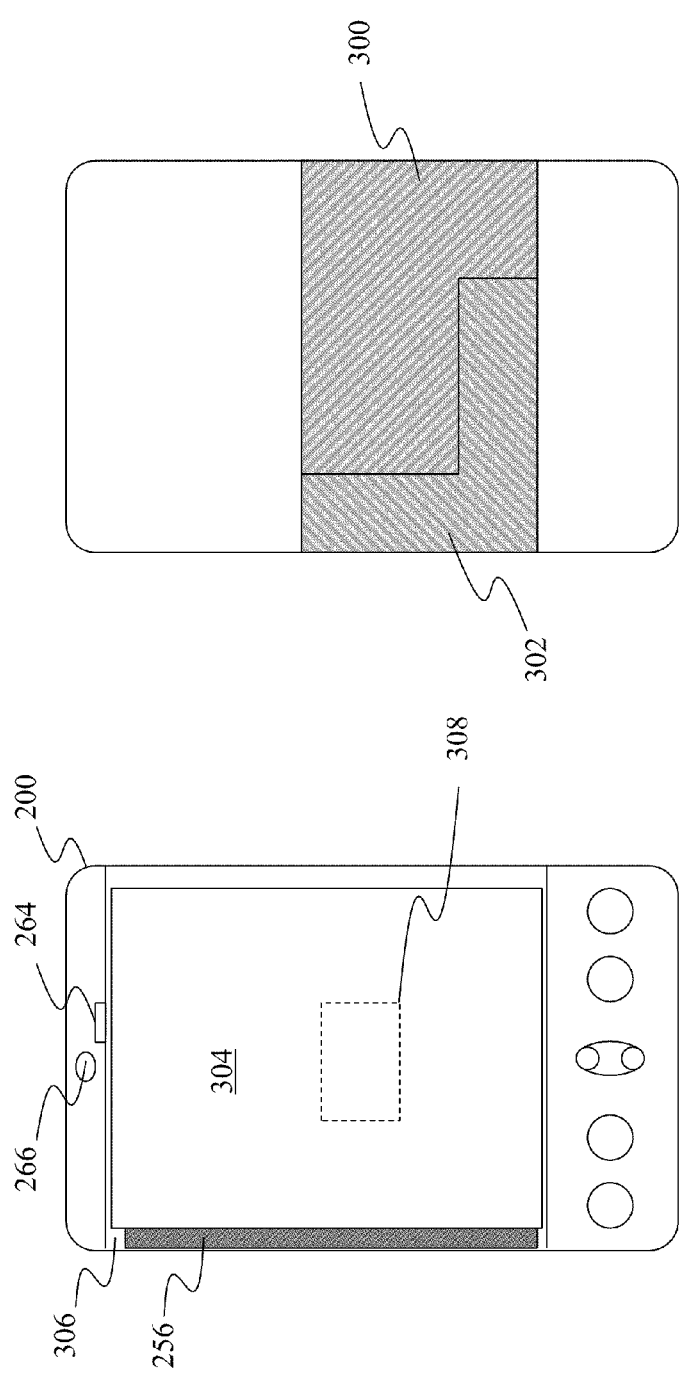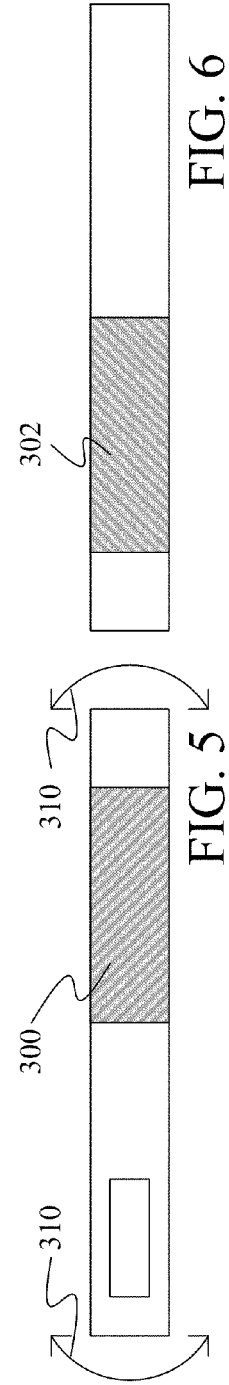

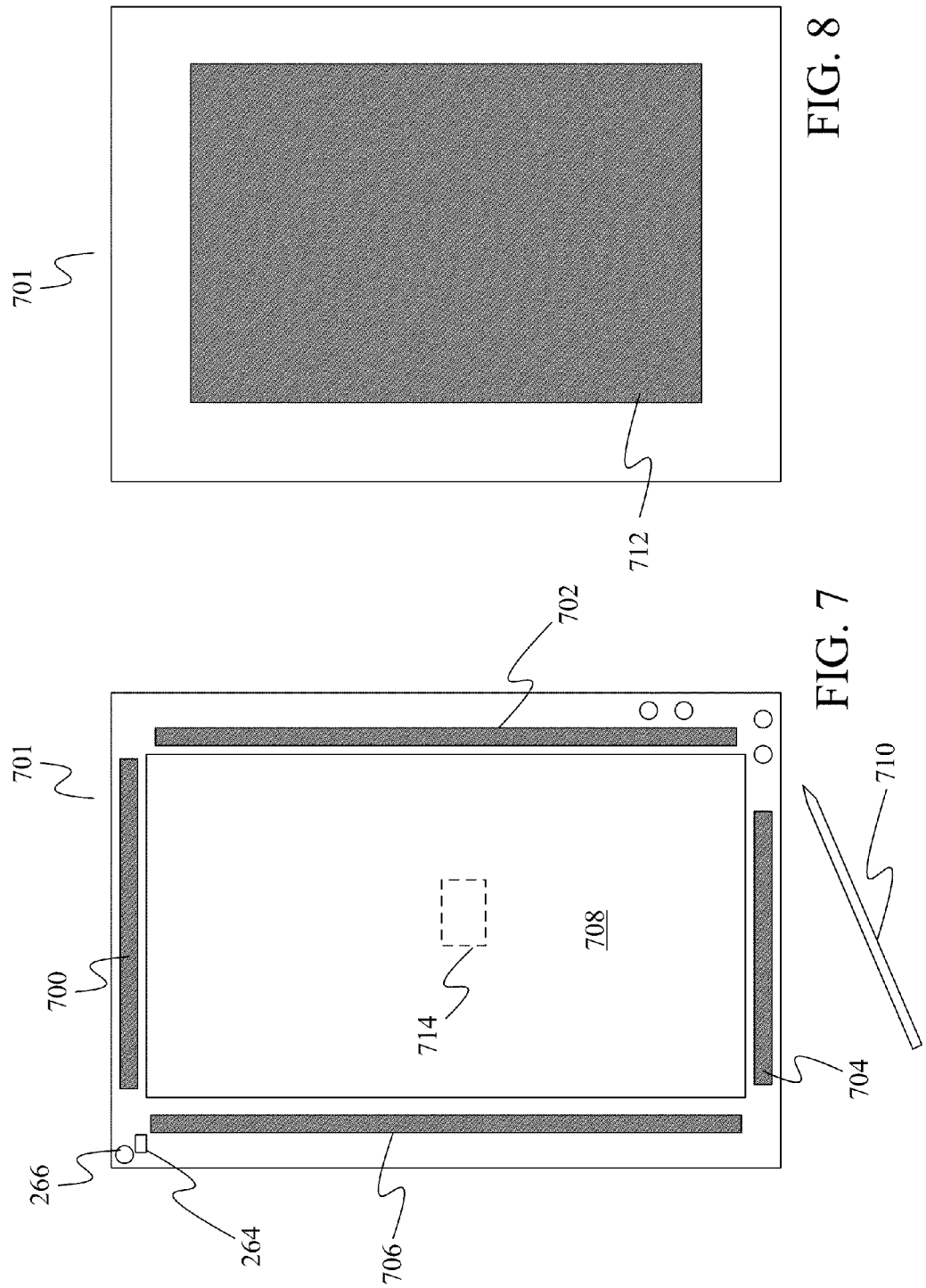

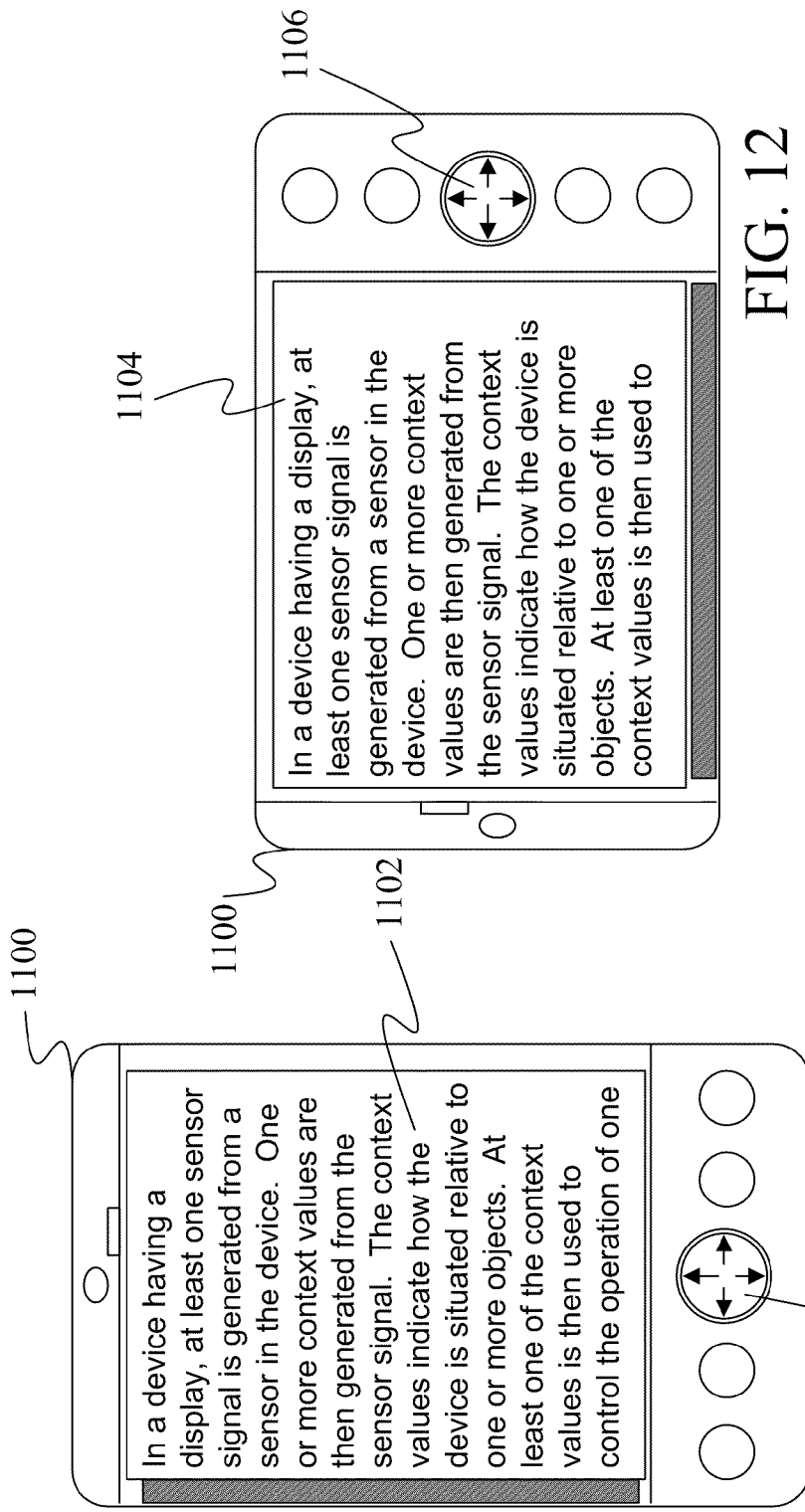

CHANGING POWER MODE BASED ON SENSORS IN A DEVICE

REFERENCE TO RELATED APPLICATION

This application is a continuation of and claims priority from U.S. patent application Ser. No. 10/294,286 filed on Nov. 14, 2002, which was a Continuation-In-Part Application of U.S. patent application Ser. No. 09/875,477, filed Jun. 6, 2001, which claims priority from a U.S. Provisional application having Ser. No. 60/218,748, filed on Jul. 17, 2000 and is a Continuation-In-Part of U.S. patent application Ser. No. 10/162,487, filed Jun. 3, 2002, which was a Continuation-In-Part of U.S. patent application Ser. No. 09/875,477 filed Jun. 6, 2001.

BACKGROUND OF THE INVENTION

The present invention relates to devices with displays. In particular, the present invention relates to computing and mobile devices.

Mobile devices, such as personal information managers (PIMs), tablet PCs, cellular telephones, pagers, watches, and wearable computers typically include one or more buttons or touch screens through which the mobile device receives explicit instructions from the user. For example, the user can press buttons to explicitly instruct the device to enter a full-power mode, activate an application, or change the orientation of a display.

Although the devices are responsive to information provided through such explicit instructions, they are generally not responsive to information that is present in the manner in which the device is being handled by the user. For example, the devices do not automatically enter a full-power mode, even when the user is holding the device in a manner that is consistent with wanting to use the device.

Because prior art devices are generally not responsive to the manner in which the user is holding the devices, the user is forced to enter explicit instructions into the device to achieve various functions. In light of this, mobile devices are needed that can sense how they are being handled in order to perform certain background functions that expand the functionality of the mobile device without requiring the user to perform any additional actions.

SUMMARY OF THE INVENTION

An orientation of a device is detected based on a signal from at least one orientation sensor in the device. In response to the detected orientation, the device is placed in a full power mode.

BRIEF DESCRIPTION OF THE DRAWINGS

FIG. 2 is a bottom view of a mobile device of one embodiment of the present invention.

FIG. 3 is a front view of the mobile device of FIG. 2.

FIG. 4 is a back view of the mobile device of FIG. 2.

FIG. 5 is a left side view of the mobile device of FIG. 2.

FIG. 6 is a right side view of the mobile device of FIG. 2.

FIG. 7 is a front view of a second embodiment of a mobile device.

FIG. 8 is a back view of the mobile device of FIG. 7.

FIG. 10 is a block diagram of components used to practice several embodiments of the present invention.

FIG. 11 is a front view of a mobile device in a portrait orientation.

FIG. 12 is a front view of a mobile device in a landscape orientation.

DETAILED DESCRIPTION OF THE PREFERRED EMBODIMENTS

Figure 1:
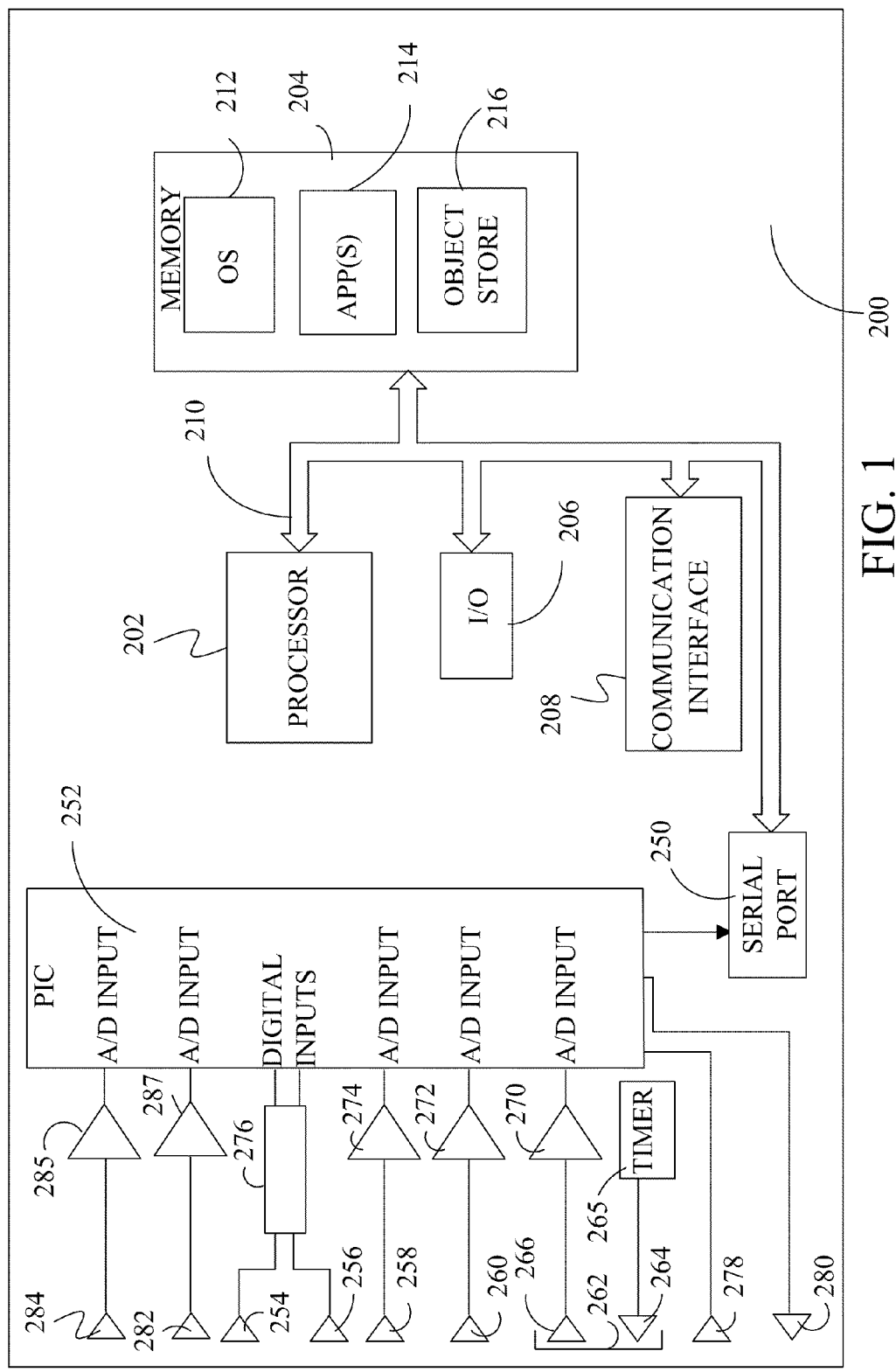
FIG. 1 is a block diagram of the components of a mobile device under one embodiment of the present invention.

FIG. 1 is a block diagram of a mobile device 200, which is an exemplary environment for embodiments of the present invention. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is a computer readable media, which can be any available media that can be accessed by processor 202 and includes both volatile and nonvolatile media, removable and non-removable media. By way of example, and not limitation, computer readable media may comprise computer storage media and communication media. Computer storage media includes both volatile and nonvolatile, removable and nonremovable media implemented in any method or technology for storage of information such as computer readable instructions, data structures, program modules or other data. Computer storage media includes, but is not limited to, RAM, TOM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by processor 202. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The particular computer readable medium used in a mobile device is a function of the size of the device and the power capacity of the device. For example, a tablet PC will typically include one or more disk drives where as a PIM will typically only include a random access memory (RAM) with a battery back-up module (not shown) such that information stored in memory 204 is not lost when the general power to mobile device 200 is shut down.

A portion of memory 204 is preferably allocated as addressable memory for program execution, while another portion of memory 204 is preferably used for storage.

Memory 204 includes an operating system 212, application programs 214, and an object store 216. During operation, operating system 212 is preferably executed by processor 202 from memory 204. Operating system 212, in one preferred embodiment, is a WINDOWS® CE brand operating system commercially available from Microsoft Corporation. In Tablet PC embodiments, Windows® XP brand operating system available from Microsoft Corporation is utilized. Operating system 212 is preferably designed for mobile devices, and implements database features that can be utilized by applications 214 through a set of exposed application programming interfaces and methods. The objects in object store 216 are maintained by applications 214 and operating system 212 at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial, parallel, USB, or Firewire communication connection, all of which are capable of transmitting streaming information.

Input/output components 206 include a variety of input devices that have previously been found on mobile devices such as a touch-sensitive screen or transparent tablet overlay sensitive to properties of a special stylus including position, proximity to the screen, pressure, azimuth, elevation, which end of the stylus is being used (e.g. writing tip on one end, eraser on the other end) and possibly a unique ID encoded in the stylus, buttons, rollers, and a microphone as well as a variety of output devices including an audio generator, a vibrating device, and a display. The devices listed above are by way of example and need not all be present on mobile device 200.

Mobile device 200 also includes additional input devices under the present invention. Under one embodiment, these input devices are connected to the mobile device through a separate serial port 250 and a peripheral interface controller (PIC) microprocessor 252. In other embodiments, these additional devices are connected to processor 202 through communication interface 208 and PIC microprocessor 252 or through PIC microprocessor 252 directly. Under one embodiment, a microchip 16C73A peripheral interface controller is used as the PIC microprocessor. In still further embodiments, PIC microprocessor 252 is not present and the input devices are connected to processor 202 through various ports such as serial port 250 or through communication interface 208, or through memory-mapped I/O or direct connection to the system processor(s).

Under the embodiment of FIG. 1, The additional input devices include a set of touch sensors such as touch sensors 254 and 256. Touch sensors 254 and 256 are provided to a separate peripheral interface controller microprocessor 276 which converts the touch signals into digital values and provides the digital values to PIC microprocessor 252. In other embodiments, touch sensors 254 and 256 are connected directly to analog or digital inputs in PIC microprocessor 252 instead of being connected to PIC 276 or are connected to processor 202.

The input devices also include a dual axis linear accelerometer tilt sensor 258 capable of detecting forward/back tilt, left/right tilt, and linear accelerations such as those resulting from vibrations or movement.

The input devices also include a light sensor 260, a proximity sensor 262 consisting of an infrared transmitter 264 and an infrared receiver 266, a digital compass (e.g. a single or multiple axis magnetometer) 284, and a gravity switch 282. The sensing signals from the infrared receiver 266, linear accelerator 258, light sensor 260, digital compass 284, and gravity switch 282 may be provided through respective amplifiers 270, 272, 274, 285 and 287 to analog inputs of PIC microprocessor 252. These analog inputs are connected to analog-to-digital converters within PIC microprocessor 252. In other embodiments, the sensors provide a digital output and thus are connected to digital inputs on the microprocessor. In further embodiments, the input devices also include a temperature sensor.

PIC microprocessor 252 also includes a connection to the power bus of mobile device 200, which is shown as connection 278 in FIG. 1. PIC microprocessor 252 also includes a connection to a power switch 280, which enables PIC microprocessor 252 to turn mobile device 200 on and off. Note that PIC microprocessor 252 always receives power and, under one embodiment, is able to control which of the sensors receives power at any one time. This allows PIC microprocessor 252 to manage power consumption by only sending power to those sensors that it anticipates will need to be active.

Under one embodiment, PIC microprocessor 252 continuously samples the sensors and transmits packets representing the state of these sensors at a rate of approximately 400 samples per second through serial port 250. In some embodiments, samples are reported at lower speeds to conserve power and processing resources. Some sensors may be reported at different sampling rates than others (e.g. tilt may be updated more frequently than touch).

Under one embodiment, the touch sensors are capacitive touch sensors that are divided into two regions. In other embodiments, these sensors are implemented as a single detector pad. Under one embodiment, the touch sensors are spread across the back and sides of mobile device 200. This is shown in more detail in FIGS. 4-6 which show a back, left side view and right side view of the outside of mobile device 200. In FIGS. 4, 5, and 6, touch sensor 254 is shown as two regions 300 and 302. Region 300 extends from the left side to the back of mobile device 200 and region 302 extends from the right side to the back of mobile device 200. When a user touches either section 300 or 302, the capacitance associated with the touched section changes indicating that the user has touched the device. Note that although the touch sensors are shown on the exterior of the device in the embodiment of FIGS. 4-6, in other embodiments, the touch sensor is located beneath an outer covering of the device.

Touch sensor 256 is shown in FIG. 3, which is a front view of mobile device 200. In the embodiment of FIG. 3, touch sensor 256 is located on the left bezel of display screen 304. In other embodiments, touch sensor 256 is located on the outer casing on the front portion of mobile device 200, but not necessarily on bezel 306 of mobile device 200.

In some embodiments, the touch sensors described above are realized using a plurality of independent touch sensors that each provides a separate touch signal. In other embodiments, the touch sensors are replaced with position sensors that indicate the location where the user is touching the device. Those skilled in the art will recognize that additional touch sensors may be added to the mobile device within the scope of the present invention.

FIGS. 7 and 8 indicate locations for touch sensors under one embodiment of a tablet PC. In FIG. 7, touch sensors 700, 702, 704, and 706 are located at various locations around the perimeter of a display 708 on the front of tablet PC 701. Sensors associated with display 708 are able to detect the location of a stylus 710 when it is near display 708 using inductive coupling between display 708 and conductors in stylus 710. Under some embodiments, the sensors associated with display 708 are able to detect the proximity of stylus 710 as well as the azimuth of the stylus.

FIG. 8 provides a back view of tablet PC 701 and shows a touch sensor 712 located on the back surface of the tablet PC.

Tablet PC 701 can be of a slate form, in which the tablet PC only includes the display for input and does not include a keyboard. The slate forms of the tablet PC can be used with a docking station to provide a connection to other input devices and memory devices.

In other embodiments, the tablet PC is a convertible device with a keyboard. Under one convertible embodiment, the keyboard is attached to the display through a pivoting connection that allows the tablet PC to be in either a closed state or an open state. In such embodiments, the display is embedded in a top portion of the tablet PC and the keyboard is embedded in a bottom portion of the tablet PC. In the closed state, the top and bottom portions of the tablet PC are brought together so that the keyboard is hidden between the top and bottom portions while the display is visible on the exterior of the top portion. In the open state, the display pivots so that it faces the keyboard.

In another convertible embodiment, the display portion of the tablet PC is detachable from a keyboard and extended device portion, which can contain various disk drives and additional memory. In such embodiments, the back touch sensor 712 can be located on the back of the display portion or on the back of the keyboard portion.

Tilt sensor 258 is shown as a single dotted element 308 in FIG. 3 and element 714 in FIG. 7. The tilt sensor is embedded within the casing of mobile device 200 and 701 and in one embodiment is located at a point about which users typically pivot mobile device 200 and 701 when tilting the device. Note that the tilt sensor's position within the mobile device is unimportant as it senses only the angle of its physical attitude with respect to gravity. The sensor's angular position within the device is important.

Under one embodiment, an Analog Devices ADXL202 two-axis linear accelerometer is used for tilt sensor 258. Such a sensor detects forward/backward tilt, shown by arrows 310 of FIG. 5, and left/right tilt, shown in the bottom view of FIG. 2 as arrows 312. The sensor also responds to linear accelerations, such as those resulting from shaking the device. Typically, the tilt sensor has a response curve both in the forward/back direction and left/right direction with the form:

$$\text{Angle} = \sin^{-1}\left(\frac{T - T_c}{k}\right) \qquad \text{EQ. 1}$$

where T is the tilt sensor value, $T_c$ is the sensor value at 0° tilt, and k is a gain parameter. In embodiments where the sensor cannot detect the sign of the gravity vector, it is unable to determine if the user is holding the device with the display facing up or down. Gravity switch 282 of FIG. 1 is thus provided in some embodiments to indicate whether the display is facing the ground. In other embodiments, a three-axis accelerometer is used to provide the sign of the gravity vector.

In addition, the tilt sensor does not respond to rotation about an axis running from the front to the back of the mobile device. Thus, the tilt sensor is unable to sense the spinning of the mobile device on its back when laid on a flat table. Digital magnetic compass 284 of FIG. 1 is thus provided in some embodiments to indicate this type of rotation. In other embodiments, solid state gyros are used instead of the compass. In further embodiments, a multiple axis magnetometer may be used in lieu of the digital compass, and combined with the tilt sensor values, to improve the robustness of the sensed compass direction.

When present, gravity switch 282 and digital compass 284 are also internal to mobile devices 200 and 701. They are not shown in FIGS. 3 and 7 to reduce the complexity of FIGS. 3 and 7.

Note that the additional input devices of FIG. 1 do not all have to be present under the present invention. Different embodiments of the invention will use different numbers of and different combinations of these additional sensors. Further, additional sensors may be added without affecting the functions of the sensors discussed in the present application.

Transmitter 264 and receiver 266 of proximity sensor 262 are shown in FIGS. 3 and 7. In the embodiment of FIG. 3, transmitter 264 is shown below and to the right of receiver 266, and both the transmitter and receiver are located at the top front of mobile device 200.

Under one embodiment, a timer 265 drives transmitter 264 at 40 kilohertz and transmitter 264 is an infrared light emitting diode with a 60° beam angle. Under such embodiments, receiver 266 is also an infrared receiver that is capable of operating at the same frequency as transmitter 264. The light produced by transmitter 264 bounces off objects that are near mobile device 200 and the reflected light is received by receiver 266. Receiver 266 typically has an automatic gain control such that the strength of the received signal is proportional to the distance to the object. In a further embodiment, multiple light emitting diodes with different beam angles may be combined to improve sensor response to both distant objects (using a narrow collimated beam angle, e.g. 5°) as well as objects that are not directly in front of the sensor (using a wide beam angle).

Figure 9:
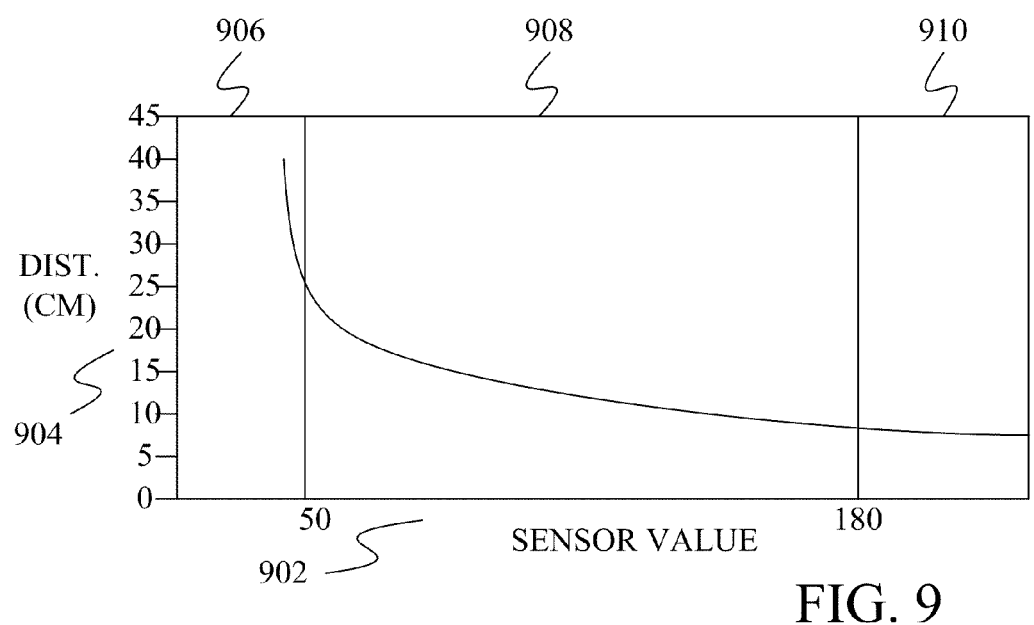
FIG. 9 is a graph of distance between a user and a mobile device as a function of proximity sensor levels.

FIG. 9 shows a response curve for one embodiment of the proximity sensor. In FIG. 9, the sensor value is shown along horizontal axis 902 and the actual distance to the object is shown along vertical axis 904. The graph of FIG. 9 is divided into three ranges. Range 906 extends from a distance of approximately 27 centimeters to infinity and indicates that no objects are within range of mobile device 200. Range 908 extends from approximately 7 centimeters to 27 centimeters and indicates that at least one object is within range of mobile device 200. Readings in third range 910, which extends from 7 centimeters to 0 centimeters, are considered to be close to mobile device 200. The response curve of FIG. 9 is described by the following equation:

$$Z_{cm} = \frac{k}{\left(\frac{p}{p_{max}} - c\right)^\alpha} \qquad \text{EQ. 2}$$

where $z_{cm}$ is the distance in centimeters to the object, p is the raw proximity reading, $p_{max}$ is the maximum sensor reading, c is a constant, α is a nonlinear parameter (0.77 in one embodiment), and k is a gain factor.

Under one embodiment, the power consumed by proximity sensor 262 is limited by pulsing transmitter 264 a few times a second when the user is out of range, or by reducing the duty cycle of timer 265.

In other embodiments, IR receiver 266 generates a digital signal instead of the analog signal shown in FIG. 1. The digital signal provides a representation of the transmitted signal. However, as the distance between the device and the user increases, the number of errors in the digital signal increases. By counting these errors, PIC 252 is able to determine the distance between the user and the device.

FIG. 10 provides a block diagram of the software components of one embodiment of the present invention. In FIG. 10, a context information server 1000 receives the sensor data from serial port 250 of FIG. 1.

Context information server 1000 acts as a broker between the sensor values received by the microprocessor 252 and a set of applications 1002 operating on mobile device 1000. Context information server 1000 continuously receives sensor data packets from PIC 252, converts the raw data into a logical form, and derives additional information from the sensor data.

Applications 1002 can access the logical form of information generated by registering with context information server 1000 to receive messages when a particular context attribute is updated. This logical form is referred to as a context attribute. Such context attributes can be based on the state of one or more sensors as well as past states of the sensors, or even anticipated (predicted) future states. Tables 1, 2, 3 and 4 below provide lists of the context attributes that an application can register to receive. In the description column of each table, specific values for the variables are shown in italics. For example, the DISPLAYORIENTATION variable can have values of flat, portrait, landscape left, landscape right, or portrait upside down.

TABLE 1

| Group | Context Variable | Description |
| --- | --- | --- |
| Touch | HoldingLeft<br>HoldingRight<br>Holdingback | Binary indication of contact with touch sensor |
|  | LeftTouchState<br>RightTouchState<br>BackTouchState | Degree of touching: OutOfRange, Inrange, Close |
|  | Holding&Duration | Whether or not the user is holding the device and for how long |
|  | TouchingBezel&<br>Duration | Whether user is touching screen bezel and for how long |

TABLE 2

| Group | Context Variable | Description |
| --- | --- | --- |
| Tilt/<br>Accelerometer | TiltAngleLR,<br>TiltAngleFB | Left/Right and Forward/Back tilt angles in degrees relative to screen orientation |
|  | TiltGravityFb<br>TiltGravityLr<br>TiltAbsAngleFb | Absolute linear acceleration<br>Absolute tilt |

TABLE 2-continued

| Group | Context Variable | Description |
| --- | --- | --- |
|  | TiltAbsAngleLr | angle |
|  | GravityDir | Facing up or down |
|  | DisplayOrientation,<br>Refresh | Flat, Portrait, LandscapeLeft, LandscapeRight, or Portrait-UpsideDown. A Refresh event is posted if apps need to update orientation |
|  | HzLR, MagnitudeLR,<br>HzFB, MagnitudeFB | Dominant frequency and magnitude from FFT of tilt angles over the last few seconds |
|  | LookingAt,<br>Duration | If user is looking at display |
|  | Moving & Duration | If device is moving in any way. |
|  | Shaking | If device is being shaken |
|  | Walking,<br>Duration | If user is walking |

TABLE 3

| Group | Context Variable | Description |
| --- | --- | --- |
| Proximity | Proximity | Estimated distance in cm to proximal object |
|  | ProximityState,<br>Duration | Close, InRange, OutOfRange, AmbientLight (when out-of-range and bright ambient light is present) |

TABLE 4

| Group | Context Variable | Description |
| --- | --- | --- |
| Other | ScreenOrientation | Current display format |
|  | VibrateOut | vibrator intensity |
|  | Light | light sensor value |
|  | Temperature | temperature sensor value |

The context attributes of Table 1 are generated based on signals from the touch sensors, those in Table 2 are generated based on tilt sensors and the gravity switch, those in Table 3 are generated based on the proximity sensors, and those in Table 4 are posted by applications other various sensors.

Each context attribute is defined in a table entry that includes the following fields:
1. A locally unique and/or globally unique identifier (GUID) for the attribute;
2. The value of the attribute;
3. The type of data that the attribute represents (e.g. integer, Boolean, etc.)
4. A read/write/read-write permission flag 5. Input, Output, or Input+Output attribute
6. Context class of attribute
7. "Dirty" data bit
8. Human-readable name and description To receive messages when a context attribute is updated, a client first generates a context client. Under one embodiment, this is done using a method CreateContextClient(myHwnd) as in:

client=CreateContextClient(myHwnd)

where client is the resulting context client object and myHwnd is the window that will handle notification messages.

After the context client is defined, context attributes to be provided to the client are requested using a call such as:
init_value=RequestNotification(client, context, usage)
where client is the client object created above, context is the name of the context attribute that the client wants to be updated on, and usage describes how the sensor will be used. The RequestNotification method returns the current value of the requested context attribute, which is assigned to init_value.

The usage parameter can have one of four values:

FgService: the application is using the attribute to provide a foreground service in which the user is manipulating the device to provide direct input to the device.

BgService: The application is using the sensor to provide a background service. This means the application is monitoring a signal to see if it meets criteria consistent with an anticipated pattern of user activity in which the user is not trying to provide input through their usage.

BgMonitor: The application is monitoring the context attribute to keep a record or log but is not directly providing a service based on the attribute.

StopUsing: The application is not currently using the attribute.

The distinction between foreground service and background service is that with a foreground service, the application is attempting to satisfy a desire that the user is explicitly requesting while with a background service, the application is attempting to perform a function that the user may or may not be aware of. For example, a user may request a foreground service of scrolling a document when a user tilts the mobile device. Thus, the user handles the mobile device in such a way as to purposefully cause scrolling. A background service may be invoked to automatically change the orientation of a display based on the readings of the tilt sensors. Thus, the user does not have to apply any attention to the device to obtain the proper orientation of the display.

When the server identifies a change in a context attribute, it sends a WM_COPYDDATA windows message to every window that requested notification for the context attribute. The windows message includes a parameter list lparam. The client can then retrieve the type of notification using GetNotifyType(lparam) and the value of the attribute using GetNotification(lparam, client, context).

When the client no longer wants notifications for an attribute, it can call a CancelNotification(client,context) method and can remove the context client from memory using DeleteContextClient(client). In addition, applications may explicitly request a change to their desired usage level(s), using a call such as:

RequestUsageChange(client, context, usage) with parameters identical to RequestNotification.

By combining the requests for notification from applications with other user activity, such as switching between different applications on the mobile device, the context server can direct or withhold context notification messages from applications to simplify the sharing of sensors.

Under one embodiment, when context server 1000 determines that an application should not be using a context attribute due to a conflict with another application, context server 1000 will issue a UsageChange message that indicates that the application must change its usage of the context attribute to StopUsing. After the context server determines that an application may resume its use of the context attribute, it will issue a UsageChange message that indicates that the application may return to using the attribute at its requested usage level.

For example, if the user switches to an application that supports tilt-to-scroll and presses a button to begin scrolling, that application requests a FgService usage of the tilt attribute in a RequestNotification when the button is pressed. When this occurs, the context manager sends a UsageChange message to all other applications that have requested usage of the tilt attribute either as FgService usage or BgService usage to indicate that each of these applications are now on a StopUsing usage of the attribute. When the user indicates that scrolling is complete, the tilt-to-scroll application posts a RequestUsageChange with a usage of StopUsing. In response, context server 1000 issues a UsageChange to each of the other applications to indicate that their usage has returned to its previous value.

In particular, the context server sends a UsageChange message to an application telling it to StopUsing a sensor when the following criteria are met:

1. The application is providing a BgService using a context attribute for which the active application activates a FgService;
2. The application is providing a FgService and it becomes inactive (e.g. the user switches to another application).

Conversely, the context server sends a UsageChange message to an application telling it to resume using an attribute at its previously requested usage level under the following conditions:

1. The application requested a FgService usage and it becomes the active application (e.g. through explicit user activation of a new program).
2. The application requested BgService usage and an active application with FgService usage on the same attribute becomes inactive.
3. The application requested BgService usage and the active application explicitly relinquishes FgService usage on an attribute by dropping to the BgService, BgMonitor, or StopUsing usage levels.

Under one embodiment of the invention, even if an application ignores the UsageChange message telling it to StopUsing a context attribute, that application will stop receiving messages from the context server for that attribute. Hence, UsageChange messages provide an opportunity for application to interact smoothly with other applications, but no further explicit programmatic action is required.

The sensors described in FIG. 1 have many novel uses under the present invention. Each of these uses is described below.

Switching Orientation Using Tilt and Movement

In some embodiments of the present invention, the tilt sensor is used to detect the orientation of the mobile device so that the image on the display of the mobile device may be matched to the mobile device orientation.

FIG. 11 provides an example of a mobile device 1100 in an upright orientation. In FIG. 11, the present invention displays an image 1102 of a set of text in a portrait orientation to match the orientation of mobile device 1100. FIG. 12 shows the same mobile device rotated counterclockwise 90°. Under the present invention, this rotation is sensed by the tilt sensors and in response, a new image 1104 of the set of text is displayed. In particular, image 1104 shows the text in a landscape view to match the new orientation of mobile device 1100.

Under the present invention, the displayed image may be matched to the orientation of the device through a simple rotation of the display image or through a redrawing of the display image based on the orientation of the device and the relative dimensions of the display in that orientation.

A simple rotation is typically performed by using the center of the screen as the center of rotation. For such rotations, a transform of points x,y in the document to a point x',y' on the screen is given by equation 3:

$$m = T \cdot R \cdot T^{-1} \quad \quad \text{EQ. 3}$$

where T is a translation and R is the 2D rotation matrix for 0°, 90°, 180°, or 270°.

A redrawing of the image that takes the dimensions of the display into consideration allows applications to change the contents of the image before redrawing the image. For instance, a word processing application can recalculate word wrapping based on the dimensions of the display in its new orientation. Thus, the number of words per line will change when the image is drawn in its new orientation. An example of this effect can be seen by comparing the text in image 1102 to the text in image 1104.

Context information server 1000 causes the image to be refreshed by sending an appropriate notification to applications 1002. These applications then generate a new image for the display.

Figure 13:
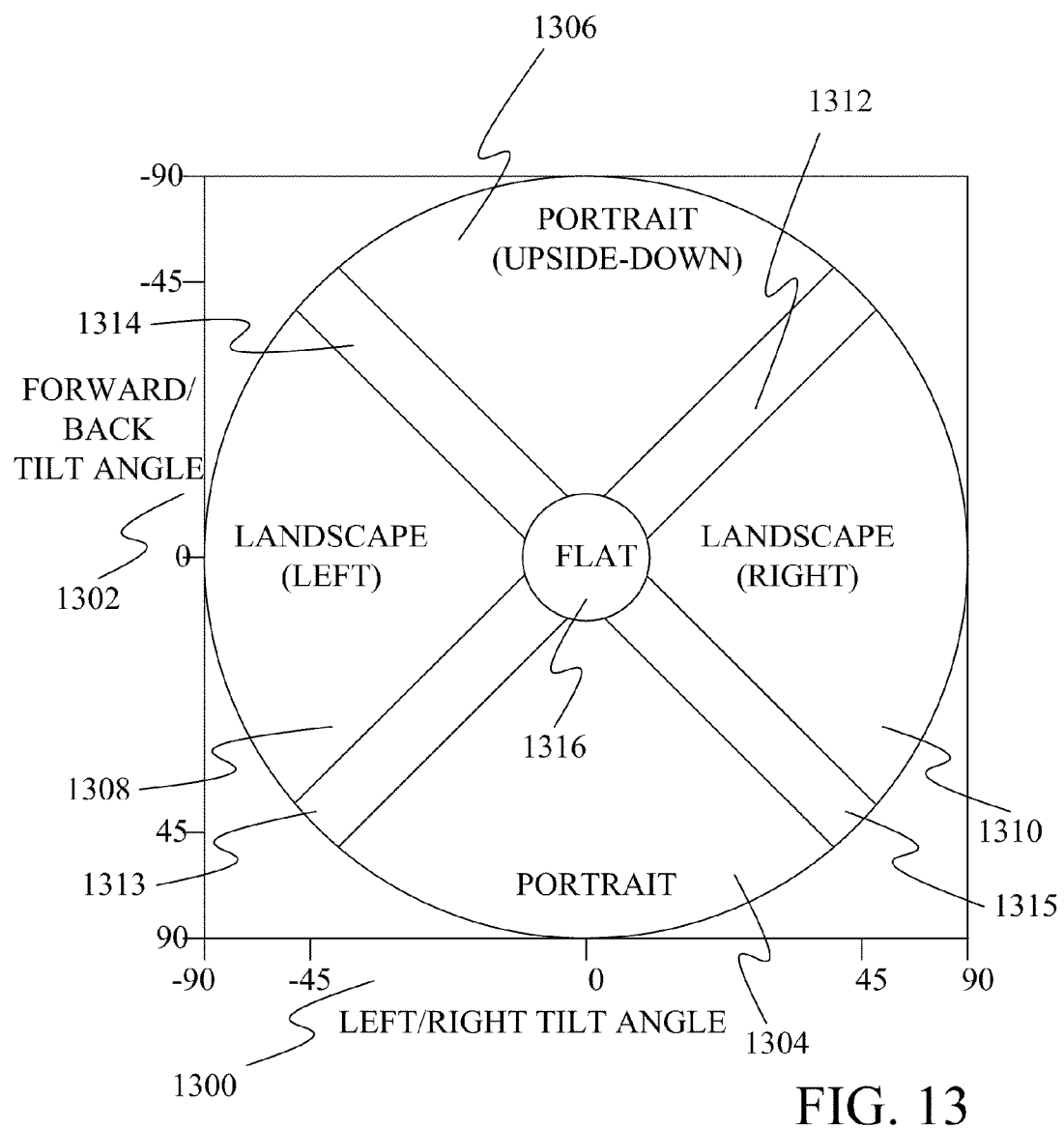
FIG. 13 is a chart showing the display orientations for various combinations of forward/back tilt and left/right tilt.

To determine the orientation of the mobile device, most embodiments of the present invention examine both the left/right tilt of the mobile device and the front/back tilt. FIG. 13 provides a graph showing the orientations determined by context information server 1000 for various combinations of left/right and forward/back tilt. In FIG. 13, left/right tilt is shown along horizontal axis 1300 and forward/back tilt is shown along vertical axis 1302. In FIG. 13, there are four orientation regions 1304, 1306, 1308, and 1310, which are separated by deadbands 1312, 1313, 1314 and 1315. FIG. 13 also includes a flat area 1316 that corresponds to the mobile device being laid flat.

Orientation area 1304 is related to an upright portrait orientation for a mobile device such as mobile device 1100 of FIG. 11. This is the typical or natural way for a user to hold the mobile device. Orientation areas 1308 and 1310 are associated with a rotation of the mobile device counterclockwise and clockwise 90°, respectively. Orientation area 1306 is associated with the mobile device being rotated 180° so that is upside down.

Transitions between these areas nominally occur when the left/right tilt equals the forward/back tilt. As shown by deadbands 1312, 1313, 1314 and 1315, the display does not switch immediately at these angles. Instead, there is a plus or minus 5° deadband to prevent jitter. Thus, the device must tilt through the entire deadband zone before context information server 1000 of FIG. 10 will issue a new orientation value. In some embodiments, there is a further 0.5 second time-out. The orientation of the device must remain at the new orientation for 0.5 full seconds before the display format changes.

Figure 14:
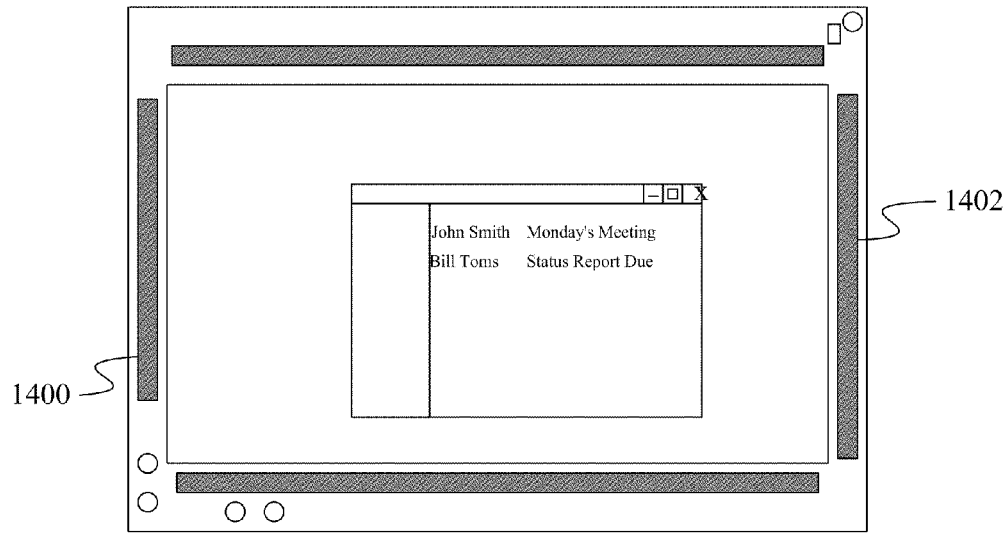
FIGS. 14 and 15 show a mobile device in two different orientations.
Figure 15:
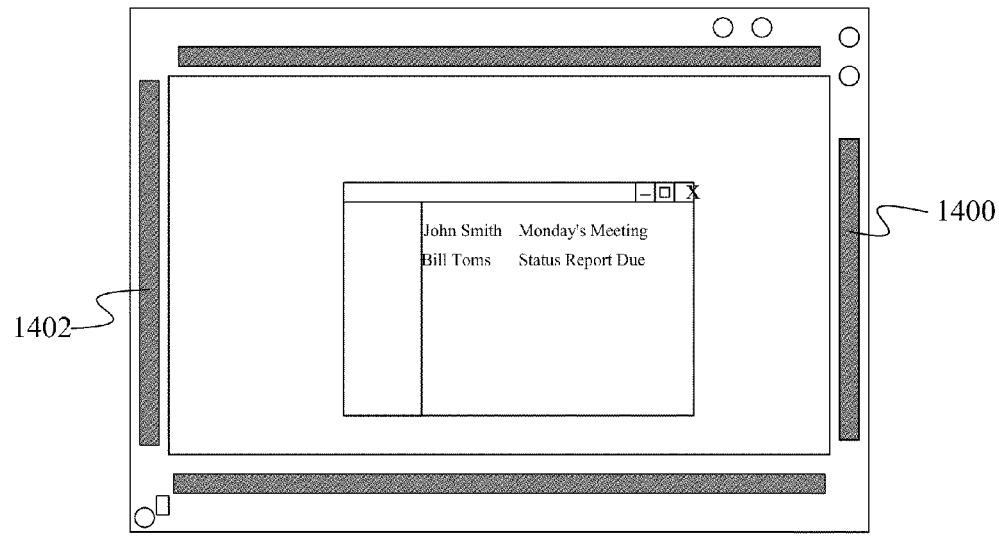

Under some embodiments of the present invention, the mobile device's touch sensor attributes are also remapped to match the orientation of the mobile device. For example, FIGS. 14 and 15 show a tablet PC in two different orientations that are 180 degrees apart. In the orientation of FIG. 14, contact with touch sensor 1400 is mapped as a contact with a left touch sensor and contact with touch sensor 1402 is mapped as contact with a right sensor. In the orientation of FIG. 15, contact with touch sensor 1400 is mapped as contact with a right touch sensor and contact with touch sensor 1402 is mapped as contact with a left touch sensor.

Under one embodiment of the present invention, the orientation of the display is stabilized to avoid undesired switching of the displayed orientation. This is achieved by monitoring the degree to which the mobile device is being moved. In particular, the mobile device should experience a relatively fast motion followed by a relative stop in the motion as the tilt angle moves from one tilt orientation to another in order to change the display orientation. In one embodiment, this movement is measured as:

$$\Delta x = \text{tilt} x - \text{prevTilt} x \quad \quad \text{EQ. 4}$$

$$\Delta y = \text{tilt} y - \text{prevTilt} y \quad \quad \text{EQ. 5}$$

$$\text{sampleEnergy} = \sqrt{\Delta x^2 + \Delta y^2} \quad \quad \text{EQ. 6}$$

$$\text{signalEnergy} = \text{signalEnergy} * (1 - \alpha) + \text{sampleEnergy} \quad \quad \text{EQ. 7}$$

where tiltx and tilty are current tilt values in the forward/back and left/right directions, respectively, prevTiltx and prevTilty are tilt values from the preceding sampling time, α is a decay rate which in one embodiment is 0.25 and signalEnergy is initialized to a value of 1.0.

The value of the signalEnergy indicates the amount of movement that the mobile device is experiencing. Under one embodiment, the mobile device is considered to be moving when the signalEnergy exceeds an onset threshold for more than a set period of time. Under one embodiment, the onset threshold is 12.0 and the period of time is 0.2 seconds. The cessation of movement is detected when the signalEnergy drops below a cessation threshold for the same amount of time. Under one embodiment, the cessation threshold is 8.0.

Under this embodiment of the invention, the context server detects movement followed by cessation of movement. If the orientation of the displayed image on the screen does not match the instantaneous screen orientation (the orientation of the device), a 1 second time-out begins. After the time-out, the context server generates a message to switch the orientation of the displayed image to match the instantaneous screen orientation. Note that although a 1 second time-out was used in this embodiment, shorter or longer time-outs may be used.

If movement begins again during the time-out, the time-out is cancelled. If the orientation of the device changes during the time-out, the time-out is restarted at its full duration.

By combining the detection of tilt with the detection of movement, the present invention reduces the probability of switching the display format by accident, or of switching the display format multiple times during a single movement.

To determine whether the displayed image can be oriented to match the orientation of the device, Windows XP provides a method for enumerating the available display formats that is called EnumDisplaySettingsEx. Under one embodiment, the resolution or color depth of the image can be dropped to a lower level if it is necessary for the graphics hardware to display the screen at the orientation dictated by the device. A ChangeDisplaySettingsEx method allows the context server to change the orientation of the displayed image to match the orientation of the device.

Orientation Preview Feedback

In mobile devices with larger displays, such as a tablet PC, changing the orientation of the display takes time, uses valuable computing resources, and can include a period of time when the display goes blank. Thus, it is desirable to give users feedback so that they can prevent a switch in the orientation display before it takes affect.

Figure 16:
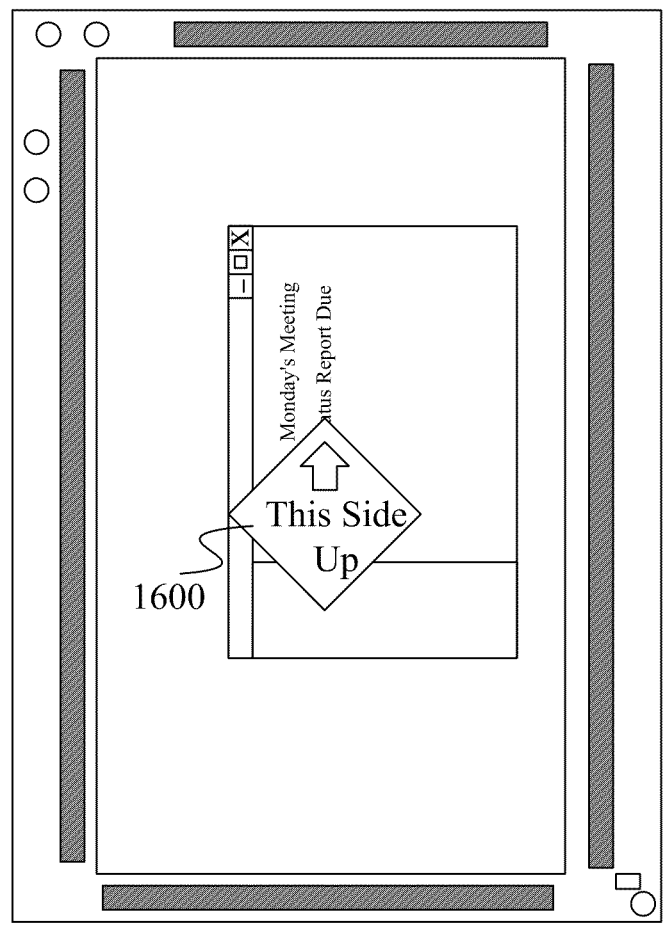
FIG. 16 shows a front view of a mobile device with an orientation feedback icon displayed.

Under one embodiment of the present invention, this feedback is presented in the form of an icon that indicates the orientation of the displayed images that will be triggered if the device is kept in its current orientation. FIG. 16 provides an example of an icon 1600 that provides this feedback. Although shown as obscuring the images below icon 1600 in FIG. 16, in other embodiments, icon 1600 is semi-transparent allowing everything outside of the diamond to be activated by mouse or pen input. The feedback icon may further contain links or zones that the user can click on with a mouse, stylus, or touchscreen to customize or disable the feature if desired.

Note that the position of the icon 1600 is defined within the previous orientation. Thus, in FIG. 16, the position of icon 1600 is defined by a pair of screen coordinates for a landscape orientation of the tablet PC. In addition, since icon 1600 is defined relative to the landscape orientation, it is actually rotated to match the orientation to which the displayed images will be switched.

The feedback icon is automatically dismissed (either immediately, or following a time-out of a few seconds) if any of the following circumstances occur:

The user switches to another application that uses the tilt attributes.

The user sets the Tablet PC down flat.

The Tablet PC senses that it is no longer moving and the orientation of the device matches the current display orientation.

The orientation of the displayed image is switched. (Note that in one embodiment, the icon remains on the display after the switch in the orientation of the display image for some period of time, such as 3 seconds. This gives the user feedback as to why the orientation switched.)

When the orientation of the displayed image switches, the icon must be redefined in order for it to appear properly on the display. In particular, the location of the icon must be redefined in terms of the coordinates that are appropriate for the new display orientation. In addition, the icon no longer needs to be rotated so the non-rotated version of the icon is displayed.

Orientation-Specific Applications

Under one embodiment of the present invention, windows that are opened in a particular orientation are hidden when the orientation changes. For example, if the user opened a word processing document while the mobile device is in a landscape orientation, the document would disappear as the user rotated the device to a portrait orientation. When the device was returned to its landscape orientation, the document would reappear.

This technique allows users to keep more windows open on the mobile device while not cluttering the display in any one orientation. Thus, for a rectangular display, there can be four different orientations resulting in four different work spaces. In each of these work spaces, the user can have different windows open. By simply rotating the mobile device, the user can access the different work spaces and the different windows open in those work spaces, without having to click on minimized windows or icons in the display.

Figure 17:
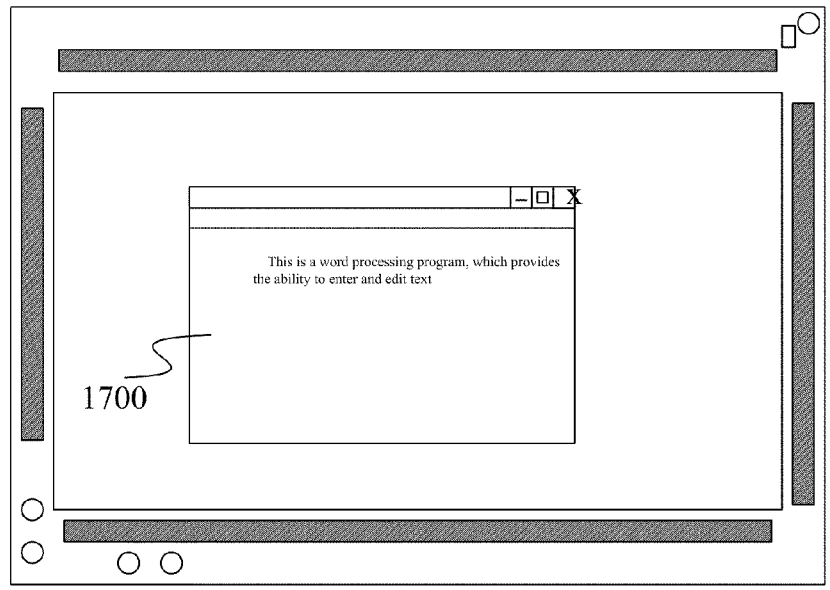
FIG. 17 shows a mobile device in a landscape orientation with a word-processing application.
Figure 18:
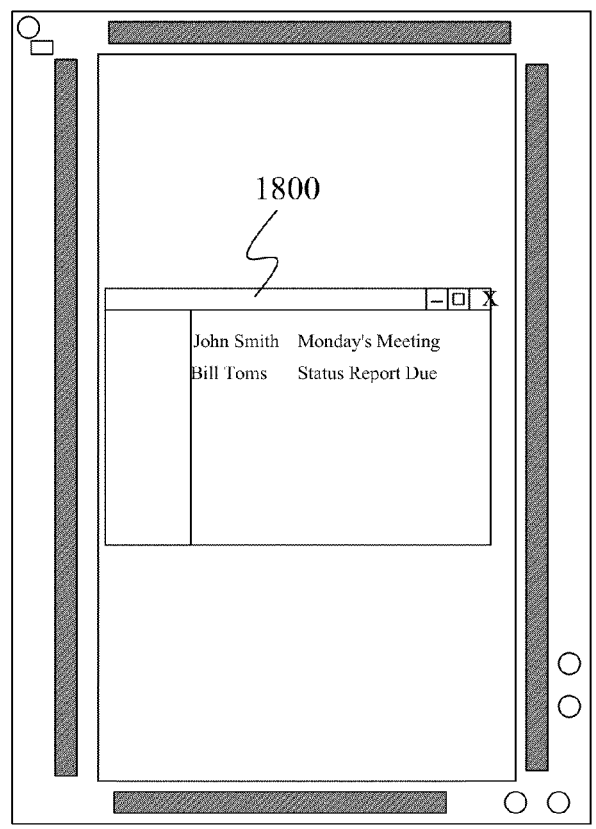
FIG. 18 shows a mobile device in a portrait orientation with an e-mail application.

FIGS. 17 and 18 show examples of orientation-specific applications. In FIG. 17 a word processing window 1700 is open while the device is in a landscape orientation. When the orientation is switched to a portrait orientation, the word processing window 1700 is hidden and an e-mail window 1800 is displayed.

Under one embodiment, the windows are hidden using the ShowWindow(SW_HIDE) Windows API call. In other embodiments, the windows are hidden by terminating the application or placing the application in hibernation.

In further embodiments, a single application can appear in more than one orientation work space. In such embodiments, the same window may appear in multiple work spaces or different windows, representing separate instances of the application, will be found in the displays for the various orientations. Thus, one orientation may show a first document in a word processing window while a second orientation may show a second document in the word processing window.

Under one embodiment, before changing the orientation of the displayed image, the windows that will be hidden when the orientation changes are removed from the display so that the user can see which windows will be lost due the change in orientation.

The idea of orientation-specific applications can be extended to orientation-specific tasks, which represent a collection of windows, data and applications that have been grouped together by the user. Thus, each orientation can display a separate set of selectable tasks to the user, thereby allowing the user to group the tasks and to find the tasks without increasing the amount of clutter on the display. An example of a task would be a combination of a word processing window and a billing window.

Although windows have been described above, any displayed item may be treated in the same way. As such, icons, menus, and backgrounds can all be orientation specific such that they only exist in selected orientations.

Saving Window Placements

When application windows are redisplayed in a new orientation, the present invention records the size and placement of the window in the previous orientation. This allows the windows to be replaced in the same position and the same size when the mobile device is returned to this position. If the position and size information were not recorded, the window may shift or change sizes due to the differences in the dimension of the display at various orientations. For example, a window that is shown in the right side of a landscape orientation may be shifted to the center and made smaller in a portrait orientation. If the position and size were not recorded as is done in the present invention, the window would be shifted to the center and appear smaller when the orientation returned to the landscape view.

This same technique can be applied to other items shown on the display such as icons and menus.

Display Contrast Adjustment

One problem encountered when using a tilted liquid crystal display is that as the display is tilted away from the user, the contrast of the displayed image is lessened. The present invention improves the displayed image by increasing the contrast of the display as the user tilts the display away from them. Note that this aspect of the present invention is not limited to personal information managers and may be used with any LCD device such as a pager, watch, laptop computer, tablet PC, cell phone, or stand alone LCD display. Under one embodiment, the contrast is set according to the following equation:

$$\text{contrast} = m \cdot dA_\beta + b \qquad \text{EQ. 5}$$

where m is a constant equal to −0.135, b is a constant equal to 5.25, $dA_{fb}$ is the change from the ideal viewing angle as measured by a tilt sensor in the display, and "contrast" is the change in the contrast setting. Note that these values correspond to the software contrast settings of 1-10 available on the Cassiopeia E105 device. To prevent hysteresis, a tilt angle change of more than 3° is typically required before the contrast is adjusted.

In further embodiments, the light level detected by the light sensor is also used to set the contrast and brightness such that the brightness increases as the ambient light increases and decreases as the ambient light decreases.

Power Management

Under one embodiment of the present invention, a mobile device, such as a tablet PC, places itself in a full-power mode based on how the device is being handled. In one particular embodiment, the invention uses a combination of sensors to determine whether the user wants the device to be in full-power mode. In particular, the system uses a touch sensor to determine whether the user is holding the device and a tilt sensor to determine whether the user has properly oriented the device so that it is likely they are looking at it. By using both a touch sensor and an orientation sensor, the present invention avoids placing the device in full-power mode when it is in a briefcase.

In one particular embodiment, the orientation for full-power mode is a left/right tilt of between plus or minus 15°, a forward/back tilt of greater than −5°, and an upright portrait orientation. If the user maintains this orientation for at least 0.5 seconds, PIC microprocessor 252 of FIG. 1 places the device in full-power mode using power switch 280. The required time interval can be set as desired but is used to prevent powering up due to transient signals.

In other embodiments, the present invention prevents a mobile device from entering an idle mode if the user is handling the device or gesturing toward the device. In idle mode, the mobile device reduces the power consumption of the device by turning off the display and/or other system components. Typically, a mobile device will enter idle mode if the user has not pressed a button or touched the screen for some period of time. Under certain types of usage, users find that the system powers down when they would rather have it remain active. For instance, this often happens when the user is reading a large amount of text or is trying to interact with someone else while periodically relating to the text.

Under one embodiment of the invention, the device is prevented from entering an idle mode when context information server 1000 determines that the user is holding the input device or when it determines that there is motion near the device. Such motion can be detected by changes in the output of the proximity sensor and is indicative of a user gesturing toward the device.

Note that this embodiment relies on motion and not just proximity. This is done to allow the device to enter idle mode when it is placed near a fixed object while it is not being used. For example, under the present invention, the device will still enter idle mode if a stack of paper is placed on top of the device.

Enlarge Double-Click Size

When the sensors detect that the user is Walking or that the Tablet is moving, the double-click thresholds are enlarged under one embodiment of the present invention to make it easier to select an object on the display. The double-click thresholds define the area on a display where a user must click twice to activate an icon or link. By increasing this area when the user is moving, the present invention makes it easier for users to successfully activate an icon or link. Similarly, system thresholds exist for distinguishing a click from a dragging (drag-and-drop) behavior, and can be enlarged with motion.

"Throw" to Dismiss

Under one embodiment of the present invention, a flinging gesture to the left or right, as if throwing the mobile device, can be sensed by the tilt sensors and can be used by an application to represent a desire by the user to dismiss a window or dialogue box, to move back to a previous page or forward to a next page, or to switch applications.

Tilt-a-Sketch

The tilt sensors in a mobile device can be used to draw on a screen. When a user tilts the mobile device, a line is drawn in the direction of the tilting. Lines can be erased by turning the mobile device upside down and shaking the device. The fact that the mobile device is upside down is detected by the gravity switch and the shaking is detected by the linear accelerometers. The tilt drawing is briefly suspended after a shake to erase so that the mobile device can be returned to its upright orientation without drawing on the screen.

Although the present invention has been described with reference to preferred embodiments, workers skilled in the art will recognize that changes may be made in form and detail without departing from the spirit and scope of the invention.

What is claimed is:

1. A device comprising:
at least one tilt sensor configured to generate tilt sensor signals indicative of at least a forward/back tilt angle of the device and a left/right tilt angle of the device;
a context information server configured to receive the tilt sensor signals and determine whether the device is in an upright portrait orientation, a landscape orientation, or a non-upright portrait orientation, based on the forward/back tilt angle and the left/right tilt angle; and
a processor configured to increase a power mode of the device in response to each of: the left/right tilt angle being in a first specified range, the forward/back tilt angle being in a second specified range, and the device being in the upright portrait orientation rather than the landscape orientation or the non-upright portrait orientation.

2. The device of claim 1 further comprising a touch sensor configured to generate a touch signal the context information server is further configured to determine that a user is holding the device in response to the touch signal.

3. The device of claim 2 wherein the processor is configured to place the device in full power mode in response to an orientation that indicates it is likely that a user is looking at the device.

4. The device of claim 3 wherein the specified range of the left/right tilt angle is between plus or minus 15 degrees and the second specified range of the forward/back tilt angle is greater than −5 degrees.

5. The device of claim 3 wherein the processor is configured to place the device in a full power mode in response to an orientation being maintained for more than a require time interval.

6. The device of claim 2, wherein the processor is configured to place the device in a full power mode in response to determining that the user is holding the device.

7. The device of claim 1, wherein the power mode of the device is increased to a full power mode, and further comprising after the device is placed in the full power mode, the processor is configured to prevent the device from entering an idle mode if a proximity sensor indicates a user is gesturing toward the device.

8. The device of claim 1, wherein the processor is configured to increase the power mode of the device in response to determining that the user is holding the device and the device being in the upright portrait orientation.

9. The device of claim 1, wherein the context information server comprises a component of the device.

10. The device of claim 9, wherein the context information server is configured to receive sensor data packets.

11. The device of claim 1, wherein the context information server is configured to receive a registration request from an application.

12. The device of claim 11, wherein the context information server is configured to update a particular context attribute based on the tilt sensor signals.

13. The device of claim 12, wherein the particular context attribute is based on a past state of the tilt sensor.

14. The device of claim 12, wherein the particular context attribute is based on a predicted future state of the tilt sensor.

15. The device of claim 12, wherein the registration request indicates that the application registers to receive the particular context attribute.

16. The device of claim 15, wherein the context information server is configured to send a message to the application based on the updated context attribute.

17. The device of claim 1, wherein the processor is configured to increase the power mode of the device to a full power mode.

18. The device of claim 17, wherein the processor is configured to increase the power mode of the device from an idle mode to the full power mode.

* * * * *